United States Patent [19]

Foster

[11] Patent Number: 5,547,067
[45] Date of Patent: Aug. 20, 1996

[54] RECIPROCATING FLOOR CONVEYOR WITH LIQUID COLLECTING BASE STRUCTURE

[76] Inventor: Raymond K. Foster, P.O. Box 1, Madras, Oreg. 97741

[21] Appl. No.: 510,383

[22] Filed: Aug. 2, 1995

[51] Int. Cl.$^6$ .................................................. B65G 25/00
[52] U.S. Cl. ..................... 198/750.3; 414/525.9
[58] Field of Search ............................... 198/750.3, 750.4; 414/525.1, 525.9

[56] References Cited

U.S. PATENT DOCUMENTS

| | | | |
|---|---|---|---|
| 3,368,315 | 2/1968 | Thurnau | 52/588 |
| 4,611,708 | 9/1986 | Foster | 198/750 |
| 4,940,132 | 7/1990 | Foster | 198/750 |
| 5,088,595 | 2/1992 | Hallstrom, Jr. | 198/750 |
| 5,096,356 | 3/1992 | Foster | 414/325 |
| 5,145,309 | 9/1992 | Foster | 414/525.1 |
| 5,238,360 | 8/1993 | Foster | 414/525.9 |

*Primary Examiner*—Joseph E. Valenza
*Attorney, Agent, or Firm*—Joan H. Pauly

[57] ABSTRACT

Adjacent base sections of a base structure of a reciprocating floor conveyor are connected along longitudinal side edges by a tongue and groove joint. Side portions of adjacent sections form a guide beam. The groove and tongue portions of the joint are formed at lower ends of angled inner walls extending downwardly from the top of the guide beam. The inner walls together define an upwardly opening space above the joint. The space is large enough, and the groove and tongue portions are spaced below the top of the guide beam a distance sufficient, to permit the joint to be sealed while maintaining the joint, including sealing portions thereof, isolated from the top of the guide beam and from a bearing positioned on the guide beam. The tongue and groove portions together define a sealing space for receiving a flexible sealant to seal the joint. Sealant oozing out of the sealing space into the space above the joint is isolated from the bearing. The joint may also be secured by a weld bead in the space above the joint. A layer of flexible sealant may be placed on top of the bead. Both the bead and the sealant are isolated from the bearing.

28 Claims, 3 Drawing Sheets

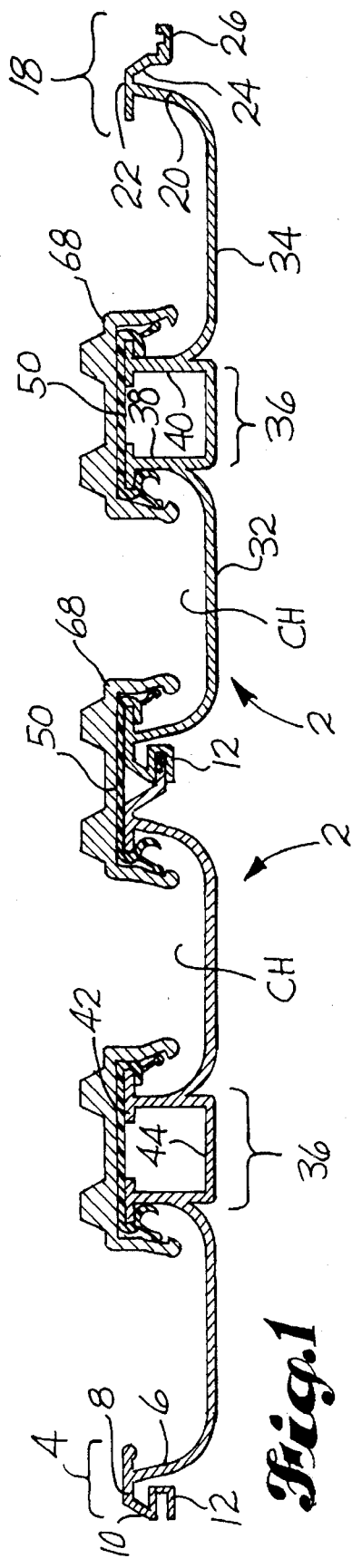
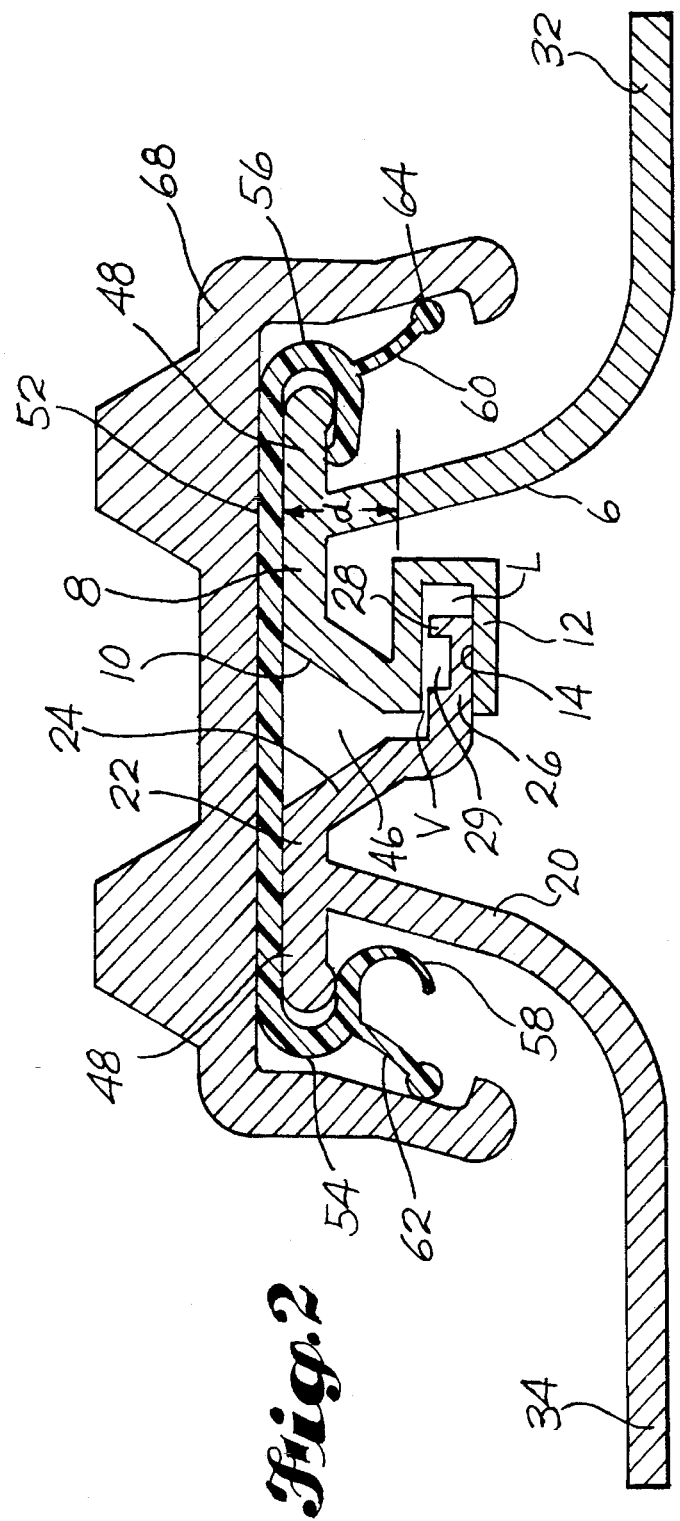

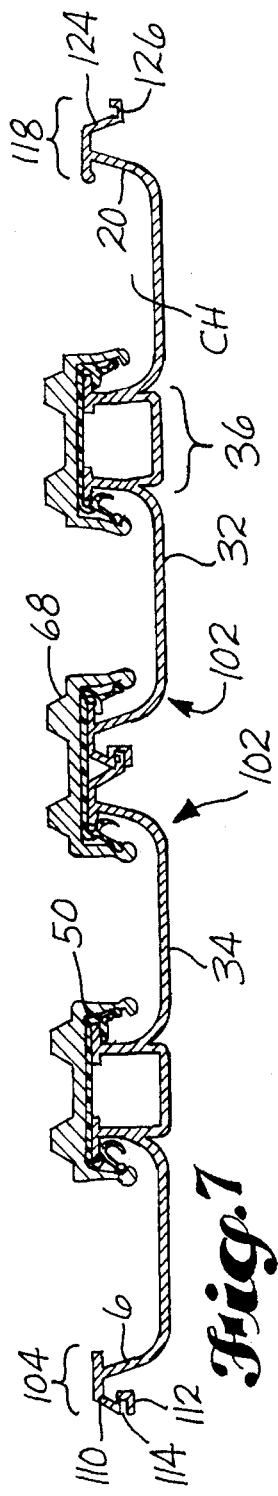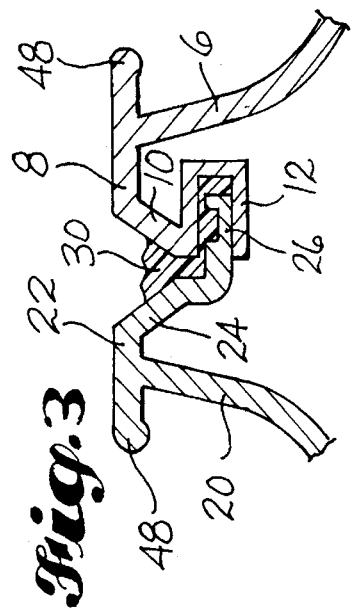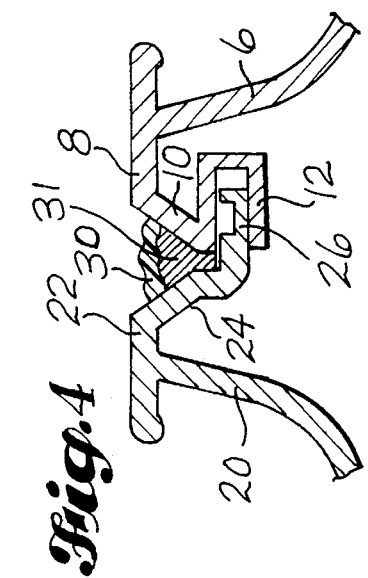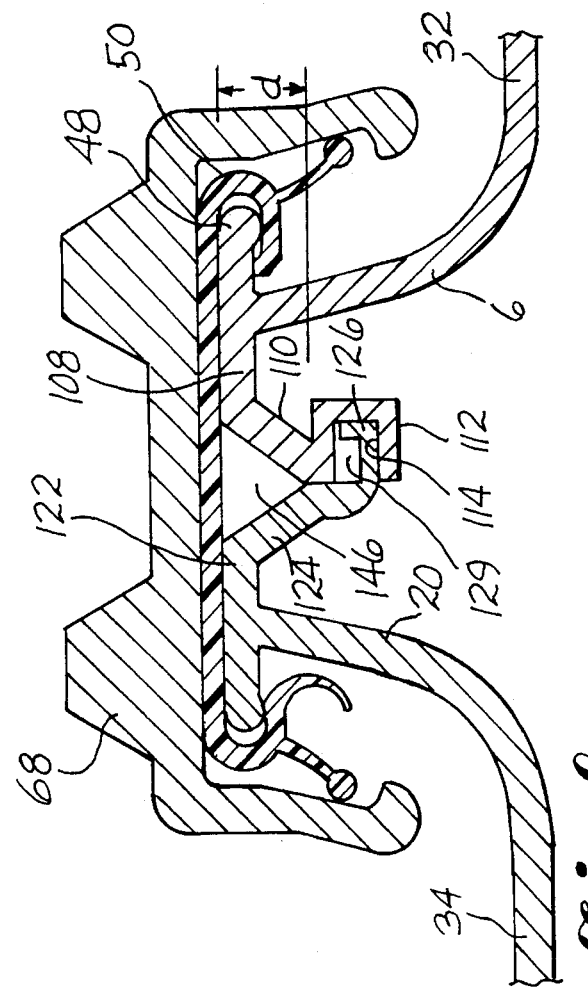

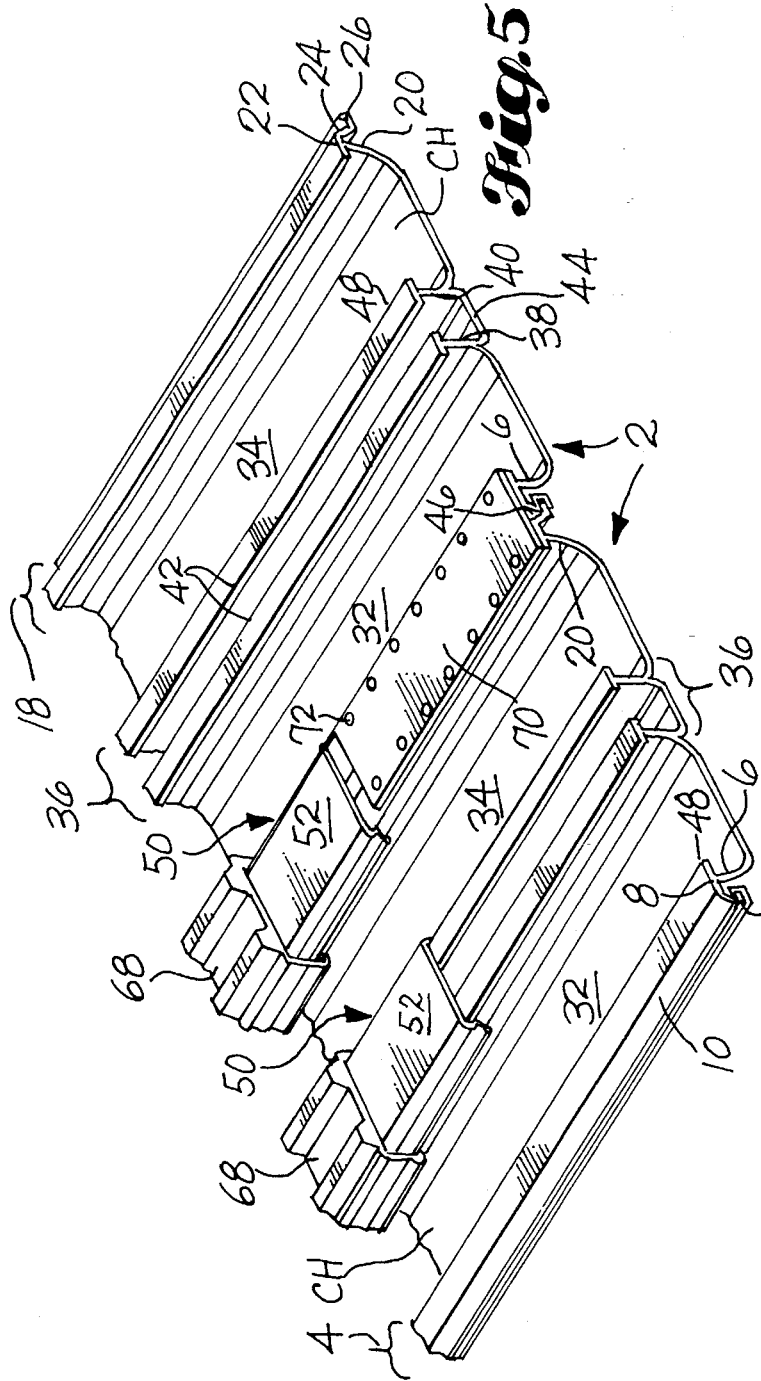
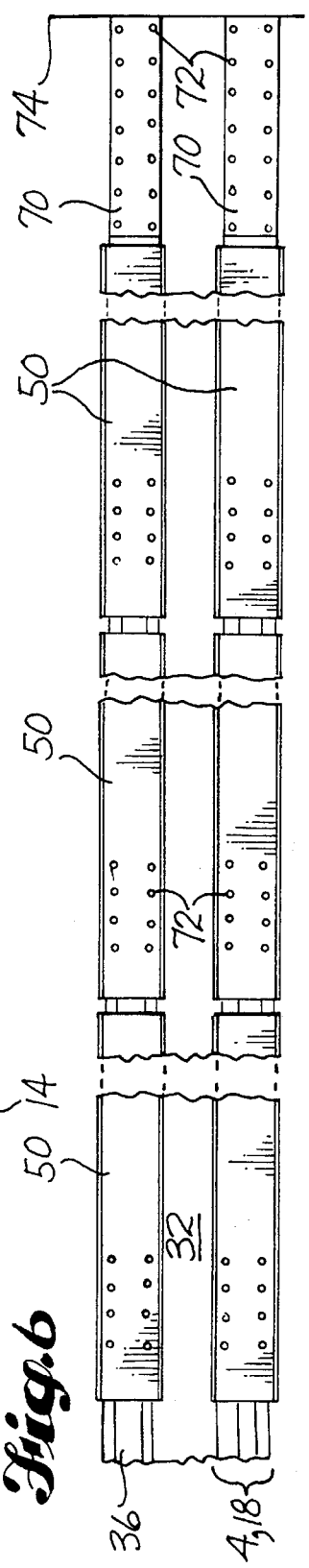

RECIPROCATING FLOOR CONVEYOR WITH LIQUID COLLECTING BASE STRUCTURE

TECHNICAL FIELD

This invention relates to reciprocating floor conveyors and base structures therefore and, more particularly, to a base structure having sections interconnected along joints that are isolated from the tops of guide beams formed by the base structure and bearings positioned on the guide beams.

BACKGROUND INFORMATION

Reciprocating floor conveyors are presently being used in a number of environments. They are being installed as floors in the bottom of large trucks and trailers for use in both loading and unloading cargo. They can also be used in railroad cars. The types of loads that may be moved by a reciprocating floor conveyor vary widely and include liquid laden loads, such as garbage. It is undesirable to allow liquid to drip downwardly from a vehicle or railroad car while the vehicle or car is in use. Therefore, there is a need for a reciprocating floor conveyor that is substantially leakproof.

The patent literature includes a number of examples of reciprocating floor conveyors that are substantially leakproof, or intended to be so. One example is disclosed in my U.S. Pat. No. 5,238,360, granted Aug. 24, 1993. This patent discloses a conveyor base structure having a plurality of longitudinal base sections that are connected together along longitudinal side edges.

The main object of the present invention is to provide an improvement in the connection between adjacent base sections in a base structure of a reciprocating floor conveyor.

SUMMARY OF THE INVENTION

A subject of the present invention is an improved connection between adjacent base sections in a reciprocating floor conveyor having a base structure that includes a plurality of longitudinal base sections connected together along longitudinal side edges. The base structure provides a plurality of laterally spaced apart guide beams and channels between the guide beams. The guide beams support slide bearings and the slide bearings in turn support longitudinal floor members. The floor members are moved longitudinally in one direction to convey a load and are retracted in the opposite direction. According to an aspect of the invention, in the improved connection, each base section includes first and second opposite side portions. The first side portion includes a first sidewall, a first top portion that forms part of a top of a guide beam, a first inner wall extending downwardly from said first top portion, and a groove portion of a tongue and groove joint carried by the first inner wall. The groove portion includes a laterally outwardly directed groove which extends longitudinally of the base section and is spaced below the top of the guide beam. The second side portion of the base section includes a second sidewall, a second top portion that forms part of the top of the guide beam, a second inner wall extending downwardly from the second top portion, and a laterally outwardly directed tongue portion of the tongue and groove joint carried by the second inner wall. The tongue portion extends longitudinally of the base section. The tongue portion of each base section extends into a groove portion of an adjacent base section to form a tongue and groove joint spaced below the top of the guide beam. The first and second inner walls of adjacent first and second side portions, respectively, together define an upwardly opening space above the joint. The space is large enough, and the groove and tongue portions are spaced below the top of the guide beam a distance sufficient, to permit the joint to be sealed while maintaining the joint, including sealing portions thereof, isolated from an area above a vertical height defined by the upper surfaces of the first and second top portions.

A preferred feature of the connection are first and second inner walls that are angled and extend from the first and second top portions, respectively, downwardly and laterally outwardly away from the first and second sidewalls, respectively. Another preferred feature is the positioning of the tongue and groove portions of the joint at lower ends of the inner walls. Still another preferred feature is a tongue and groove joint that provides vertical and lateral clearance between the groove portion and tongue portion to permit relative vertical and lateral movement between adjacent base sections. Each of these preferred features may be provided individually or in combination with one or more of the other preferred features.

In general, it is preferable that each tongue and groove joint be sealed. In one embodiment, the tongue and groove portions of each joint together define a sealing space configured to receive a sealing material to seal the joint. The upwardly opening space is large enough, and the groove and tongue portions are spaced below the top of the guide beam a distance sufficient, to maintain the area above the guide beam isolated from portions of the sealing material that may ooze out of the sealing space and into the upwardly opening space. In another embodiment, in a fully assembled conveyor, each joint comprises a weld bead located above the tongue and groove portions. The area above the guide beam is isolated from the bead.

Another subject of the invention is a reciprocating floor conveyor comprising a base structure, a plurality of slide bearings, and a plurality of floor members. According to an aspect of the invention, the base structure includes a plurality of longitudinal base sections connected together along longitudinal side edges. The base structure provides a plurality of laterally spaced apart guide beams and channels between the guide beams. Each base section includes first and second opposite side portions. The first side portion includes a first sidewall, a first top portion that forms part of a top of a guide beam, a first inner wall extending downwardly from the first top portion, and a groove portion of a tongue and groove joint carried by the first inner wall. The second side portion includes a second sidewall, a second top portion that forms part of the top of the guide beam, a second inner wall extending downwardly from the second top portion, and a laterally outwardly directed tongue portion of the tongue and groove joint carried by the second inner wall. The tongue portion extends longitudinally of the base section within the groove portion of an adjacent base section. There is a slide bearing for each guide beam. The slide bearing has a top portion which sets down on top of its guide beam. The floor members extend longitudinally of the conveyor and are supported by the guide beams. The floor members are laterally spaced apart with channels provided by the base structure therebetween. The first and second inner walls of adjacent first and second side portions, respectively, together define an upwardly opening space above the joint. The space is large enough, and the groove and tongue portions are spaced below the top of the guide beam a distance sufficient, to permit the joint to be sealed while maintaining the joint, including sealing portions thereof, isolated from the slide bearing for the guide beam.

The conveyor may in addition have one or more of the preferred features discussed above. For example, the tongue and groove joints in the conveyor are preferably sealed. They may be sealed as described above or by other suitable means.

BRIEF DESCRIPTION OF THE DRAWINGS

In the drawings, like element designations refer to like parts throughout, and:

FIG. 1 is a sectional view of two base sections of a base structure of a reciprocating floor conveyor that include a first preferred embodiment of the connection between the adjacent base sections.

FIG. 2 is an enlarged sectional view of the portion of the structure shown in FIG. 1 that includes the connection.

FIG. 3 is a fragmentary sectional view of the connection shown in FIGS. 1 and 2, illustrating the use of a flexible sealant to seal the tongue and groove joint.

FIG. 4 is like FIG. 3 except that it illustrates the use of a weld bead and a thin layer of sealant to secure and seal the joint.

FIG. 5 is a pictorial view of end portions of the base sections shown in FIG. 1 and related structure.

FIG. 6 is a top plan view of a portion of a reciprocating floor conveyor incorporating the elements shown in FIG. 5.

FIG. 7 is like FIG. 1 except that it shows a second embodiment of the connection.

FIG. 8 is like FIG. 2 but shows the embodiment of FIG. 7.

BEST MODES FOR CARRYING OUT THE INVENTION

The drawings show two embodiments of a base section 2, 102 each of which provides an improved connection between adjacent base sections. The drawings also show additional related portions of a reciprocating floor conveyor. The illustrated structures are constructed according to the invention and constitute the best modes for carrying out the invention currently known to the applicant. In the drawings, the base sections 2, 102 are shown in use in a reciprocating floor conveyor along with bearings 50 and floor members 68. It is currently anticipated that the improved connection of the invention will be used in combination with the type of bearings and floor members shown in the drawings. However, it is intended to be understood that the connection could also be used in combination with other types of bearings and other types of floor members without departing from the spirit and scope of the invention as defined by the claims.

Referring to FIGS. 1–6, the first embodiment of the base section 2 has first and second opposite side portions 4, 18 which provide longitudinal side edges along which adjacent base sections 2 are connected together. At the junction of two base sections 2, the interconnected side portions 4, 18 together form a guide beam 4, 18. Each base section 2 also includes an integral guide beam 36 positioned between its opposite side portions 4, 18. The guide beam 36 is spaced apart from the opposite side portions 4, 18 with channels CH formed by the base section 2 therebetween.

The details of the first and second side portions 4, 18 are best seen in FIG. 2. The first side portion 4 includes a first sidewall 6 that extends upwardly from a bottom wall 32 of the base section 2 which forms the bottom of one of the channels CH. The sidewall 6 extends upwardly and angles slightly laterally away from the bottom wall 32. As can be seen in FIG. 2, the bottom portion of the sidewall 6 that extends integrally from the bottom wall 32 is curved to form a smooth transition and provide increased strength to the base structure. A top portion 8 of the side portion 4 extends horizontally from the top of the sidewall 6 in a direction opposite to that of the bottom wall 32. The top portion 8 extends from the sidewall 6 to an outer end from which an angled inner wall 10 extends downwardly. The inner wall 10 carries a groove portion 12 of a tongue and groove joint 12, 26. The groove portion 12 defines a laterally outwardly directed groove 14 extending longitudinally of the base section 2 for receiving a tongue to thereby connect adjacent base sections 2.

As illustrated, the groove portion 12 is formed on the lower end of the angled wall 10. This is presently the preferred configuration of the improved connection. However, the groove portion could be carried by the inner wall 10 at a location above the bottom of the inner wall 10. For example, the groove portion 12 could be carried on a mid portion of the inner wall 10 with the inner wall 10 forming a support leg that depends downwardly from the groove portion 12.

The second side portion 18 has a sidewall 20 that extends upwardly and laterally away from a bottom wall 34 that forms the bottom of another channel CH. The sidewall 20 is essentially a mirror image of the sidewall 6. The second side portion 18 also includes a top portion 22 and an angled inner wall 24. The top portion 22 extends horizontally from the top of the sidewall 20 and, in the assembled base structure, toward the top portion 8 of the first side portion 4 of the adjacent base section 2. The angled inner wall 24 extends downwardly from the outer end of the top portion 22. A tongue 26 of the tongue and groove joint 12, 26 is carried by the inner wall 24 and extends laterally outwardly therefrom. It preferably extends from the lower end of the inner wall 24. As shown in FIG. 2, when the adjacent base sections 2 are connected together, the tongue 26 of the second side portion 18 extends into the groove 14 of the first side portion 4 of the adjacent base section 2.

As noted above, the interconnected adjacent first and second side portions 4, 16 together form a guide beam. The top portions 8, 22 each form part of the top of the guide beam 4, 18. The tongue and groove joint 12, 26 is spaced below the top of the guide beam 4, 18. The reference character d in FIG. 2 represents the distance by which the top surface of the top of the guide beam 4, 18 is spaced from the joint 12, 26. In accordance with the invention, the spacing is provided in order to isolate the joint 12, 26 from the top of the guide beam 4, 18 and from a bearing positioned on the guide beam 4, 18.

The inner walls 10, 24 preferably extend downwardly and laterally outwardly toward each other and away from their respective sidewalls 6, 20, as shown in FIG. 2. However, this configuration may be varied without departing from the spirit and scope of the invention. For example, the inner walls could be vertical with no angling toward each other. Whatever the specific orientation of the inner walls, the inner walls together define an upwardly opening space above the tongue and groove joint. Referring to FIG. 2, the inner walls 10, 24 together define a V-shaped space 46 therebetween.

In the embodiment shown in Figs. 1–6, the tongue and groove joint 12, 26 provides vertical clearance V and lateral clearance L between the groove portion 12 and the tongue 26. This permits relative vertical and lateral movement between adjacent base sections 2. Such relative movement allows for adjustment of the positions of adjacent base sections 2 during the installation of the conveyor and the assembly of the base sections 2 into a base structure for the conveyor. It also allows for relative movement to accommodate, for example, thermal expansion following installation and during use of the conveyor in situations in which the joint is either not sealed or is sealed by a flexible sealant. The joint is preferably sealed to help achieve the goal of a leakproof base structure for the conveyor.

The tongue 26 and groove portion 12 forming the joint together define a sealing space 29 for sealing the joint 12, 26. The outer end of the tongue 26 has a projection 28 extending upwardly therefrom. The projection 28 defines the laterally outer end of a slot formed along the tongue 26. This slot and the adjacent confronting wall of the groove portion 12 define the sealing space 29.

Referring to FIG. 3, the sealing space 29 is configured to receive a sealing material 30 to seal the joint 12, 26. The sealing material 30 is preferably a flexible sealant, such as the sealant sold under the trademark SIKAFLEX. The sealant may be placed in the slot on the tongue 26 and/or in the groove 14 prior to assembling the base sections 2 together. Alternatively, the sealant may be injected into the sealing space 29 following positioning of the tongue 26 in the groove 14. In either case, the sealant preferably fills the sealing space 29 and the vertical and lateral clearances V, L formed between the tongue and groove portions 26, 12, as shown in Fig. 3. Some of the sealant 30 also oozes up out of the sealing space 29 into the V-shaped upwardly opening space 46 formed between the inner walls 10, 24. Still referring to FIG. 3, it can be seen that the space 46 is large enough, and the distance d by which the joint 12, 26 is spaced below the top surface of the guide beam 4, 18 is sufficient, to maintain the area above the vertical height defined by the upper surfaces of the top portions 8, 22 isolated from the sealant 30. The dimensioning also serves to isolate a bearing 50 placed on the guide beam 4, 18 from the sealant 30.

FIG. 4 illustrates an alternate means for sealing the joint 12, 26. Following the positioning of the tongue 26 in the groove 14 and the completion of the assembly of the base structure, the inner walls 10, 24 may be welded together to secure the joint 12, 26. The welding procedure creates a weld bead 31 extending longitudinally above the tongue and groove portions 26, 12 in the V-shaped space 46. In order to help ensure that the joint 12, 26 is sealed, a thin layer of sealant 0 may be placed over the weld bead 31. When the sealing process has been completed, the area above the guide beam 4, 8 is isolated from both the weld bead 31 and the layer of sealant 30 to isolate the joint 12, 26, as described above.

Referring to FIGS. 1, 5, each intermediate guide beam 36 includes a pair of opposite vertical walls 38, 40 joined to the lower walls 32, 34, respectively, of the base section 2 at a curved interface. A top portion 42 that forms part of the top of the guide beam 36 extends horizontally from the top of each vertical wall 38, 40. The top of the guide beam 36 is open between the top portions 42. The bottom of the guide beam 36 is closed by a bottom wall 44. The top of the guide beam could also be closed, and the bottom could be open. However, the illustrated configuration is preferred since it permits the base section 2 to be riveted or otherwise secured to an underlying structure by securing the bottom wall 44 thereto.

Each of the vertical walls 38, 40 and the sidewalls 6, 20 has a side edge portion 48 extending laterally outwardly therefrom opposite the corresponding top portion 42, 8, 22.

For each guide beam 4, 18 and 36, the opposite side edge portions 48 provide a means by which a bearing 50 engages the beam 4, 18, 36. The preferred configuration of the bearing 50 is best seen in FIG. 2. Each bearing 50 has a top portion 52, a first side channel portion 54, a second side channel portion 56, a cam portion 58, and first and second lock flanges 60, 62. Each lock flange 60, 62 includes a lower edge portion in the form of a circular bead 64. The structure of the bearing 50 and the manner in which it is installed on and engages the guide beam 4, 18, 36 is described further in my U.S. Pat. No. 4,238,360. The portion of that patent relating thereto is incorporated herein by reference.

The guide beams 4, 18, 36 support the bearings 50, which in turn support longitudinal floor members 68. The floor members may take various configurations. The illustrated configuration of the floor members 68 is similar to the configuration shown in my aforementioned U.S. Pat. No. 5,238,360 with the exceptions that the floor member 68 is narrower and lacks the inside walls 116,118 shown in the floor member 10 in the patent. In addition, each guide beam 4, 18, 36 is provided with its own individual floor member 68. This results in there being a liquid collecting channel CH between each pair of adjacent guide beams 4, 18, 36.

FIGS. 5 and 6 illustrate portions of a reciprocating floor conveyor incorporating the base section 2 and improved connection of the invention. The floor members 68 are moved longitudinally in one direction to convey a load and are retracted in the opposite direction, in a known manner. Each floor section is supported by a plurality of bearings 50. Adjacent bearings 50 are spaced longitudinally apart a small amount, for example about one-half inch, in order to allow for thermal expansion of the bearings. For the same reason, each bearing 50 is secured to the underlying guide beam 4, 18, 36 by rivets 72 only on one end of the bearing 50.

At the discharge end of the conveyor (e.g. the rear of a trailer), represented by the line 74 in FIG. 6, the bearings 50 terminate inwardly of the end 74. Between the outermost bearing 50 and the end 74, a wear strip 70 is secured to the underlying guide beam 4, 18, 36 by rivets 72. As can be seen best in FIG. 6, the wear strip 70 is essentially the same width as the guide beam 4, 18, 36 and is narrower than the bearing 50. The strip 70 is spaced longitudinally from the adjacent bearing 50 for the same reason that adjacent bearings 50 are spaced from each other. The wear strips 70 function as stops for the bearings 50. The wear strips 70 are preferably made from a plastic material that is highly wear resistant. One example is the nylon and molybdenum disulphide material sold under the trademark NYLATRON. The bearings 50 are preferably made from a self-lubricating plastic, such as polyethylene.

FIGS. 7 and 8 are similar to FIGS. 1 and 2 except that they show a modified form of the base section 102. Elements in FIGS. 7 and 8 that are the same as the elements shown in FIGS. 1-6 are given the same reference numerals as in FIGS. 1-6. Referring to FIGS. 7 and 8, the difference between the two embodiments is found in the details of the structure of the tongue and groove joint 126, 112. The first side portion 104 of the base section 102 has a sidewall 6, a top portion 108 extending laterally from the top of the sidewall 6, and an angled inner wall 110 extending downwardly from the outer end of the top portion 108. A groove portion 112 of the tongue and groove joint is carried by the lower end of the angled wall 110. The second side portion 118 includes a sidewall 20, a top portion 122, and an angled inner wall 124. The lower end of the angled wall 124 carries a tongue 126 that is received into the groove 114 formed by the groove portion 112 of the adjacent first side portion 104.

As in the embodiment shown in Figs. 1-6, the tongue and groove portions 126, 112 together define a sealing space 129. The difference in the joint is that the tongue 126 and the groove 114 are shorter than the corresponding elements 26, 14 in the first embodiment. As a result, there is little, if any, vertical and lateral clearance between the tongue and groove portions 126, 112. Above the joint 112, 126, there is an upwardly opening V-shaped space 146. This space 146 functions in the same manner as the space 46 provided by the embodiment shown in FIGS. 1–6.

In reciprocating floor conveyors including the improved connection of the invention, the tongue and groove joint between base sections is isolated from the top of the guide beam formed by the side portions of adjacent base sections and from a bearing having a top portion that sets down on top of the guide beam. The dimensioning of the spacing of the tongue and groove joint and the upwardly opening space above the joint allows the joint to be sealed while maintaining the joint, including sealing portions thereof, isolated from the top of the guide beam and the bearing. As illustrated in FIGS. 3 and 4 and described above, this prevents contact between the bearing and sealant 30 that may enter the space above the joint. The bearing is protected from contamination by the sealant, and sticking of the bearing to the guide beam caused by the sealant is avoided. With regard to the weld bead 31 illustrated in FIG. 4, the isolation of the joint helps simplify the installation procedure of the base structure of the conveyor. Since there is ample space above the joint and below the bearing, there is no need to sand down the weld bead 31 to ensure that it does not contact the bearing.

Although the preferred embodiments of the invention have ben illustrated and described herein, it is intended to be understood by those skilled in the art that various modifications and omissions in form and detail may be made without departing from the spirit and scope of the invention as defined by the following claims.

What is claimed is:

1. In a reciprocating floor conveyor having a base structure that includes a plurality of longitudinal base sections that are connected together along longitudinal side edges, said base structure providing a plurality of laterally spaced apart guide beams and channels between the guide beams, said guide beams supporting slide bearings and said slide bearings in turn supporting longitudinal floor members which are moved longitudinally in one direction to convey a load and are retracted in the opposite direction, an improved connection between adjacent base sections, comprising:

each said base section including first and second opposite side portions;

said first side portion including a first sidewall, a first top portion that forms part of a top of a guide beam, a first inner wall extending downwardly from said first top portion, and a groove portion of a tongue and groove joint carried by said first inner wall, said groove portion including a laterally outwardly directed groove which extends longitudinally of the base section and is spaced below said top of said guide beam;

said second side portion of the base section including a second sidewall, a second top portion that forms part of said top of said guide beam, a second inner wall extending downwardly from said second top portion, and a laterally outwardly directed tongue portion of said tongue and groove joint carried by said second inner wall, said tongue portion extending longitudinally of the base section;

said tongue portion of each said base section extending into a groove portion of an adjacent base section to form a tongue and groove joint spaced below said top of said guide beam; and said first and second inner walls of adjacent first and second side portions, respectively, together defining an upwardly opening space above said joint, said space being large enough, and said groove and tongue portions being spaced below said top of said guide beam a distance sufficient, to permit said joint to be sealed while maintaining said joint, including sealing portions thereof, isolated from an area above a vertical height defined by the upper surfaces of said first and second top portions.

2. The connection of claim 1, in which said first inner wall is angled and extends from said first top portion downwardly and laterally outwardly away from said first sidewall, and said second inner wall is angled and extends from said second top portion downwardly and laterally outwardly away from said second sidewall toward said first inner wall.

3. The connection of claim 1, in which said groove portion is positioned at a lower end of said first inner wall, and said tongue portion is positioned at a lower end of said second inner wall.

4. The connection of claim 3, in which said tongue and groove joint provides vertical and lateral clearance between said groove portion and said tongue portion to permit relative vertical and lateral movement between adjacent base sections.

5. The connection of claim 2, in which said tongue and groove joint provides vertical and lateral clearance between said groove portion and said tongue portion to permit relative vertical and lateral movement between adjacent base sections.

6. The connection of claim 1, in which said tongue and groove joint provides vertical and lateral clearance between said groove portion and said tongue portion to permit relative vertical and lateral movement between adjacent base sections.

7. The connection of claim 6, in which, in each said joint, said tongue portion and said groove portion together define a sealing space configured to receive a sealing material to seal said joint; and said upwardly opening space is large enough, and said groove and tongue portions are spaced below said top of said guide beam a distance sufficient, to maintain said area isolated from portions of said sealing material that may ooze out of said sealing space into said upwardly opening space.

8. The connection of claim 1, in which, in each said joint, said tongue portion and said groove portion together define a sealing space configured to receive a sealing material to seal said joint; and said upwardly opening space is large enough, and said groove and tongue portions are spaced below said top of said guide beam a distance sufficient, to maintain said area isolated from portions of said sealing material that may ooze out of said sealing space into said upwardly opening space.

9. The connection of claim 1, in which, in a fully assembled conveyor, each said joint comprises a weld bead located above said tongue and groove portions, said area being isolated from said bead.

10. The connection of claim 2, in which, in a fully assembled conveyor, each said joint comprises a weld bead located above said tongue and groove portions, said area being isolated from said bead.

11. The connection of claim 5, in which, in a fully assembled conveyor, each said joint comprises a weld bead located above said tongue and groove portions, said area being isolated from said bead.

12. The connection of claim 6, in which, in a fully assembled conveyor, each said joint comprises a weld bead located above said tongue and groove portions, said area being isolated from said bead.

13. In a reciprocating floor conveyor having a base structure that includes a plurality of longitudinal base sections that are connected together along longitudinal side edges, said base structure providing a plurality of laterally spaced apart guide beams and channels between the guide beams, said guide beams supporting slide bearings and said slide bearings in turn supporting longitudinal floor members which are moved longitudinally in one direction to convey a load and are retracted in the opposite direction, an improved connection between adjacent base sections, comprising:

each said base section including first and second opposite side portions;

said first side portion including a first sidewall; a first top portion that forms part of a top of a guide beam; a first angled wall extending from said first top portion, downwardly and laterally outwardly away from said first sidewall, to a lower end; and a groove portion of a tongue and groove joint at said lower end, said groove portion including a laterally outwardly directed groove which extends longitudinally of the base section and is spaced below said top of said guide beam;

said second side portion of the base section including a second sidewall; a second top portion that forms part of said top of said guide beam; a second angled wall extending from said second top portion, downwardly and laterally outwardly away from said second sidewall toward said lower end of said first angled wall; and a laterally outwardly directed tongue portion of said tongue and groove joint at a lower end of said second angled wall, said tongue portion extending longitudinally of the base section;

said tongue portion of each said base section extending into a groove portion of an adjacent base section to form a tongue and groove joint spaced below said top of said guide beam; and said first and second angled walls of adjacent first and second side portions, respectively, together defining an upwardly opening, downwardly tapering space above said joint, said space being large enough, and said groove and tongue portions being spaced below said top of said guide beam a distance sufficient, to permit said joint to be sealed while maintaining said joint, including sealing portions thereof, isolated from an area above a vertical height defined by the upper surfaces of said first and second top portions.

14. The connection of claim 13, in Which said tongue and groove joint provides vertical and lateral clearance between said groove portion and said tongue portion to permit relative vertical and lateral movement between adjacent base sections.

15. The connection of claim 14, in which, in each said joint, said tongue portion and said groove portion together define a sealing space configured to receive a sealing material to seal said joint; and said upwardly opening space is large enough, and said groove and tongue portions are spaced below said top of said guide beam a distance sufficient, to maintain said area isolated from portions of said sealing material that may ooze out of said sealing space into said upwardly opening space.

16. The connection of claim 13, in which, in each said joint, said tongue portion and said groove portion together define a sealing space configured to receive a sealing material to seal said joint; and said upwardly opening space is large enough, and said groove and tongue portions are spaced below said top of said guide beam a distance sufficient, to maintain said area isolated from portions of said sealing material that may ooze out of said sealing space into said upwardly opening space.

17. The connection of claim 13, in which, in a fully assembled conveyor, each said joint comprises a weld bead located above said tongue and groove portions, said area being isolated from said bead.

18. The connection of claim 14, in which, in a fully assembled conveyor, each said joint comprises a weld bead located above said tongue and groove portions, said area being isolated from said bead.

19. A reciprocating floor conveyor, comprising:

a base structure including a plurality of longitudinal base sections connected together along longitudinal side edges; said base structure providing a plurality of laterally spaced apart guide beams and channels between the guide beams; each said base section including first and second opposite side portions; said first side portion including a first sidewall, a first top portion that forms part of a top of a guide beam, a first inner wall extending downwardly from said first top portion, and a groove portion of a tongue and groove joint carried by said first inner wall; and said second side portion including a second sidewall, a second top portion that forms part of said top of said guide beam, a second inner wall extending downwardly from said second top portion, and a laterally outwardly directed tongue portion of said tongue and groove joint carried by said second inner wall, said tongue portion extending longitudinally of the base section within the groove portion of an adjacent base section;

a slide bearing for each guide beam, said slide bearing having a top portion which sets down on top of its guide beam; and a plurality of floor members extending longitudinally of the conveyor and supported by said guide beams, said floor members being laterally spaced apart with channels provided by said base structure therebetween;

wherein said first and second inner walls of adjacent first and second side portions, respectively, together define an upwardly opening space above said joint, said space being large enough, and said groove and tongue portions being spaced below said top of said guide beam a distance sufficient, to permit said joint to be sealed while maintaining said joint, including sealing portions thereof, isolated from the slide bearing for said guide beam.

20. The conveyor of claim 19, in which said first inner wall is angled and extends from said first top portion downwardly and laterally outwardly away from said first sidewall, and said second inner wall is angled and extends from said second top portion downwardly and laterally outwardly away from said second sidewall toward said first inner wall.

21. The conveyor of claim 20, in which said tongue and groove joint provides vertical and lateral clearance between said groove portion and said tongue portion to permit relative vertical and lateral movement between adjacent base sections.

22. The conveyor of claim 19, in which said tongue and groove joint provides vertical and lateral clearance between said groove portion and said tongue portion to permit relative vertical and lateral movement between adjacent base sections.

23. The conveyor of claim 22, in which, in each said joint, said tongue portion and said groove portion together define a sealing space configured to receive a sealing material to seal said joint; and said upwardly opening space is large enough, and said groove and tongue portions are spaced below said top of said guide beam a distance sufficient, to maintain said slide bearing isolated from portions of said sealing material that may ooze out of said sealing space into said upwardly opening space.

24. The conveyor of claim 19, in which, in each said joint, said tongue portion and said groove portion together define a sealing space configured to receive a sealing material to seal said joint; and said upwardly opening space is large enough, and said groove and tongue portions are spaced below said top of said guide beam a distance sufficient, to maintain said slide bearing isolated from portions of said sealing material that may ooze out of said sealing space into said upwardly opening space.

25. The conveyor of claim 19, in which, when the conveyor is fully assembled and ready for operation, each said joint comprises a weld bead located above said tongue and groove portions, said slide bearing being isolated from said bead.

26. The conveyor of claim 20, in which, when the conveyor is fully assembled and ready for operation, each said joint comprises a weld bead located above said tongue and groove portions, said slide bearing being isolated from said bead.

27. The conveyor of claim 21, in which, when the conveyor is fully assembled and ready for operation, each said joint comprises a weld bead located above said tongue and groove portions, said slide bearing being isolated from said bead.

28. The conveyor of claim 22, in which, when the conveyor is fully assembled and ready for operation, each said joint comprises a weld bead located above said tongue and groove portions, said slide bearing being isolated from said bead.

* * * * *